United States Patent [19]
Dimou et al.

[11] Patent Number: 5,766,677
[45] Date of Patent: Jun. 16, 1998

[54] PROCESS FOR MANUFACTURING A COVER GLASS WITH A VIEWING FIELD

[76] Inventors: George Dimou, 47 Shrewsbury Square, Scarborough, Ontario, Canada, M1T 1L4; Thomas W. S. Pang, 44 Charles St. West, #2719, Toronto, Ontario, Canada, M4Y 1R7

[21] Appl. No.: 714,368

[22] Filed: Sep. 16, 1996

[51] Int. Cl.⁶ ................................. C23C 16/06
[52] U.S. Cl. .............. 427/166; 427/250; 427/255; 427/282; 427/287; 204/192.15; 204/192.27; 356/244; 359/397
[58] Field of Search .................. 427/250, 255, 427/166, 282, 287; 204/192.15, 192.27; 356/244; 359/397

[56] References Cited

U.S. PATENT DOCUMENTS

| | | | |
|---|---|---|---|
| 1,647,865 | 11/1927 | Hausser | 356/39 |
| 1,994,483 | 3/1935 | Ott | 88/40 |
| 1,996,141 | 4/1935 | Broadhurst et al. | 359/397 |
| 2,235,310 | 3/1941 | Bausch | 356/39 |
| 2,328,585 | 9/1943 | Rooney | 356/39 |
| 2,600,121 | 6/1952 | McGee et al. | 316/22 |
| 2,660,091 | 11/1953 | McCallum | 356/39 |
| 3,829,216 | 8/1974 | Persidsky | 356/36 |
| 4,183,614 | 1/1980 | Feldman | 350/94 |
| 4,190,314 | 2/1980 | Goldsmith | 350/94 |
| 4,415,405 | 11/1983 | Ruddle et al. | 156/645 |
| 4,556,297 | 12/1985 | Schulz, Jr. | 350/529 |

FOREIGN PATENT DOCUMENTS

| | | |
|---|---|---|
| 616283 | 1/1949 | United Kingdom . |

OTHER PUBLICATIONS

An Improved Membrane Filter Technique for Evaluation of Asbestos Fibers, by T.W.S Pang, F.A. Schonfeld–Starr, and K. Patel. *Am. Ind. Hug. Assoc. J. 50(3):174–180 Mar., 1989.*

*Primary Examiner*—Shrive Beck
*Assistant Examiner*—Timothy Meeks
*Attorney, Agent, or Firm*—Hill & Schumacher; Dowell & Dowell, P.C.

[57] ABSTRACT

A process for imprinting viewing fields on a cover glass is disclosed. First, the cover glass is annealed. A grid is then placed on the annealed cover glass. The grid has small openings which define the viewing fields. The annealed cover glass with a grid thereon is then coated with a thin film of an inert metal which can adhere to glass. The thin film is applied by way of a high vacuum coating method or a sputtering method. The grid is then removed from the coated cover glass. The coated cover glass is particularly useful in the preparation of microscope slides of filters having asbestos fibers or the like deposited thereon. A portion of the filter, which is smaller than the cover glass, is cut. The cut portion of the filter is placed onto either the coated cover glass or the microscope slide to form a filter combination. The filter combination is then cleared with a clearing solution. The filter combination is then fixed to the microscope slide or cover glass by means of a fixative. The filter is positioned such that when the slide is prepared the side of the filter having fibers deposited thereon is adjacent to the imprint on the cover glass.

14 Claims, 5 Drawing Sheets

PROCESS FOR MANUFACTURING A COVER GLASS WITH A VIEWING FIELD

FIELD OF THE INVENTION

The present invention relates to a process for producing a cover glass for use in association with microscopes, and in particular, to a process for producing a cover glass with viewing fields marked thereon. In addition the present invention relates to the use of the cover glass in the preparation of a microscope slide for asbestos and synthetic mineral fibre counting and the like.

BACKGROUND OF THE INVENTION

It is well known to provide viewing fields or grid patterns on microscope slides for measurement purposes. The use of viewing fields make it possible for the user to identify a limited or restricted portion of the slide and count the relevant component within that field or grid.

To date much effort has been directed to providing viewing fields or a grid pattern on microscope slides or cover glasses that have closely spaced and very thin lines. For example, U.S. Pat. No. 4,183,614 issued to Feldman, Jan. 15, 1980, discloses a microscope slide with a film on one face thereof. The film has a grid pattern produced by photochemical etching and is about 1,000 to 5,000 Å thick. The slide is coated with a photosensitive film that is less transparent than the slide or substrate. Selected portions of the film are removed by photochemical etching to form the viewing fields or grid pattern.

U.S. Pat. No. 4,415,405 issued to Ruddle, Nov. 15, 1983, is directed to a method for engraving a grid pattern on microscope slides and slips. Ruddle employs a multi-step photographic technique to create a grid pattern image in a photoresist coating on the slide or slip. Specifically the steps include applying a positive photoresist to the slide; exposing the coating to a grid pattern of transmitted light; removing the exposed portion with positive photoresist developer; etching the exposed portions with acid; and removing the remaining coating. The resulting coating has a thickness in the order of 0.5 to 10 microns, and the final dimension of each grid square is about 0.56 m.

Another approach was suggested by Schulz in U.S. Pat. No. 4,556,297 issued Dec. 3, 1985. This patent discloses an optical counting device including an absorbent donut portion and a plate imprinted with a grid. This device was developed for counting mineral particles or other particles suspended in liquid. The gridiron has 1 mm interstices.

These and other prior art patents, however, have problems in that they have failed to provide viewing fields or grid patterns with very small areas for accurate measurement. In addition, none of these prior art patents disclose a method to apply the fields which results in a film that is 2.5–5.0 nm thick. Further it is desirable to provide such a method that is relatively easy and simple to carry out.

The use of a grid pattern is also a generally known practice in the evaluating of the asbestos fibres. An Improved Membrane Filter Technique for Evaluation of Asbestos Fibers, by T. W. S. Pang, F. A. Schonfeld-Starr, and K. Patel, *Am. Ind. Hug. Assoc. J.* 50(3):174–180(1989), by one of the inventors, of the present invention discloses a technique to prepare asbestos fibres collected on a celluloseester filter for evaluation of asbestos fibres. In this method, the filter is first cleared with a clearing solution and then gold microscope grids are placed on the filter for phase contrast microscopy(PCM) before applying the Euparal resin and placing the cover slip thereon.

However, several problems have been discovered with regard to the application of this method. For instance, since the grid pattern rests on top of the filter, a false positive or negative half fibre can be counted when the end of a fibre is too close to the perimeter of a grid opening, i.e., the viewing field. Also, when the slides are stored in a vertical position, the gold electron microscope grids may drift downward within the Euparal resin and effectively change the locations of the viewing fields.

Therefore, it is advantageous to provide an improved method that permits asbestos and synthetic mineral fibres to be enumerated more accurately.

SUMMARY OF THE INVENTION

The object of the present invention is to provide a relatively simple and improved process for preparing stable and well-defined viewing fields for counting asbestos and synthetic mineral fibres using phase contrast microscopy (PCM).

Another object of the present invention is to provide an improved process for imprinting a noble metal or a combination of more than one noble metal, which can adhere to glass, on a cover glass to imprint viewing fields thereon.

One aspect of the invention discloses a process for imprinting viewing fields on a cover glass. First, the cover glass is annealed. A grid is then placed on the annealed cover glass. The grid has small openings which define viewing fields. The annealed cover glass with a grid thereon is then coated with a thin film of an inert metal which can adhere to glass. The thin film is applied by way of a high vacuum coating method or a sputtering method. The grid is then removed from the coated cover glass.

Another aspect of the invention is the use of the imprinted cover glass in the preparation of microscope slides of filters having asbestos fibres or the like deposited thereon. A portion of the filter is cut and placed onto the cover glass or the microscope slide to form a filter combination. The filter combination is cleared with a clearing solution. The cleared filter combination is placed onto the cover glass or the microscope slide which has a fixative thereon. The filter combination is then fixed to the cover glass or the microscope slide.

Further features of the invention will be described or will become apparent in the course of the following detailed description.

BRIEF DESCRIPTION OF THE DRAWINGS

The invention will now be described by way of example only, with reference to the accompanying drawings, in which.

DESCRIPTION OF THE PREFERRED EMBODIMENT

Figure 1:
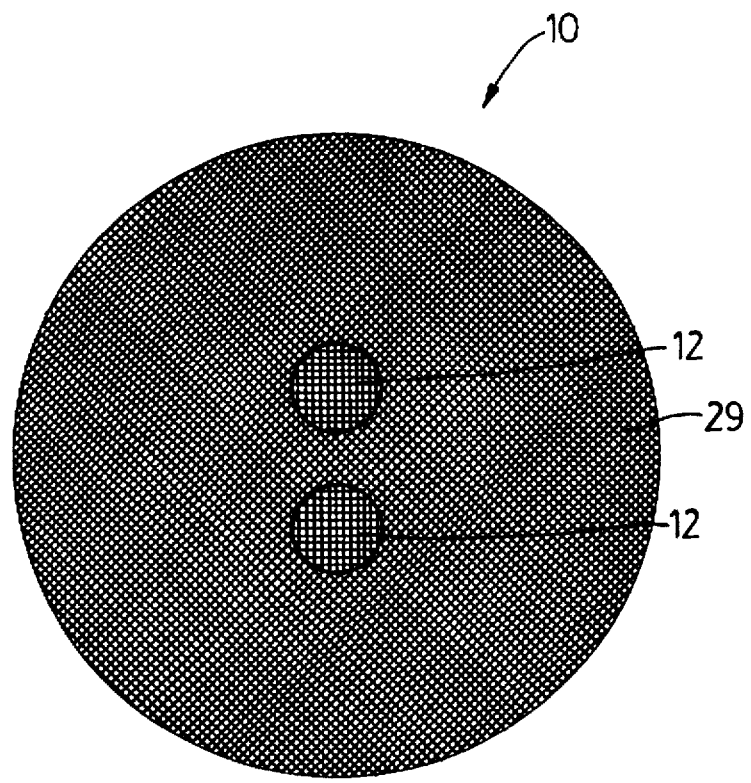
FIG. 1 is a top view of a cover glass of the present invention on which viewing fields have been imprinted.
Figure 2:
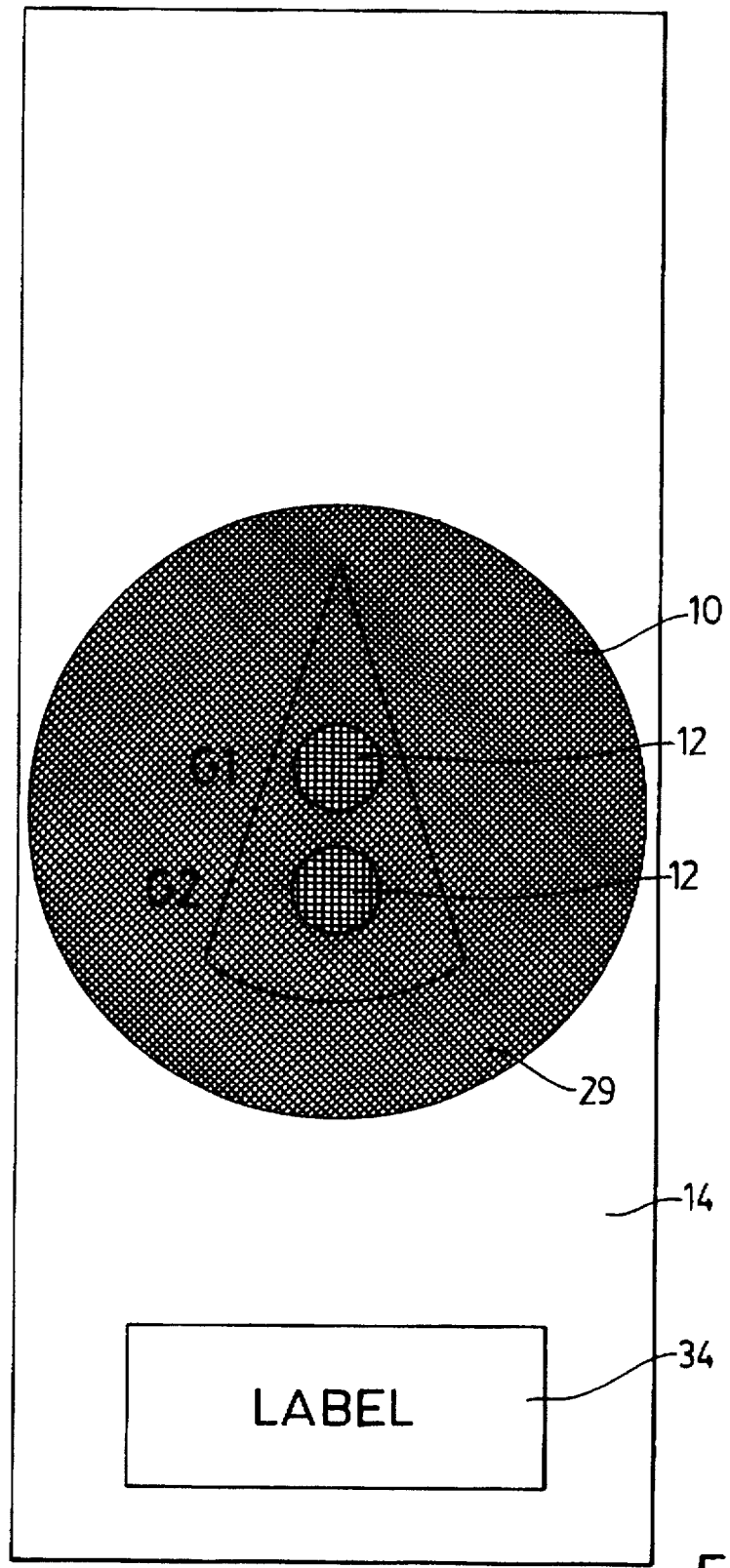
FIG. 2 is a top view of the microscope slide prepared according to the present invention.

Referring to the drawings and in particular FIGS. 1 and 2, the cover glass of the present invention is shown generally at 10. Cover glass 10 has two viewing fields 12 imprinted thereon. A slide 14 of the material to be viewed 16 has the cover glass 10 attached thereto. The process for imprinting viewing fields 12 onto cover glass 10 will now be discussed followed by a discussion of the process for preparing microscope slide 14 for asbestos or fibre counting.

The cover glass 10 shown here is a round glass, generally 25 mm in diameter or less. It will be appreciated by those skilled in the art that a square cover glass could also be used. The inventors have found that the square cover glasses are currently cheaper to purchase. In addition, when preparing the cover glasses in accordance with the present invention, the space in the furnace is more effectively utilized when square cover glasses are used. Therefore, preferably square cover glasses are used. However, for the purposes of the drawings a round cover glass is shown. The cover glass 10 is annealed at 250° C. in a muffle furnace. A template (shown in FIG. 3), for example a gold or copper electron microscope grid 18 (shown in FIG. 3), is placed near the centre of cover glass 10. A second grid 18 is then placed adjacent to the first grid such that the openings are more or less parallel with those of the first gird and so that two viewing fields 12 will be imprinted onto cover glass 10.

Figure 3:
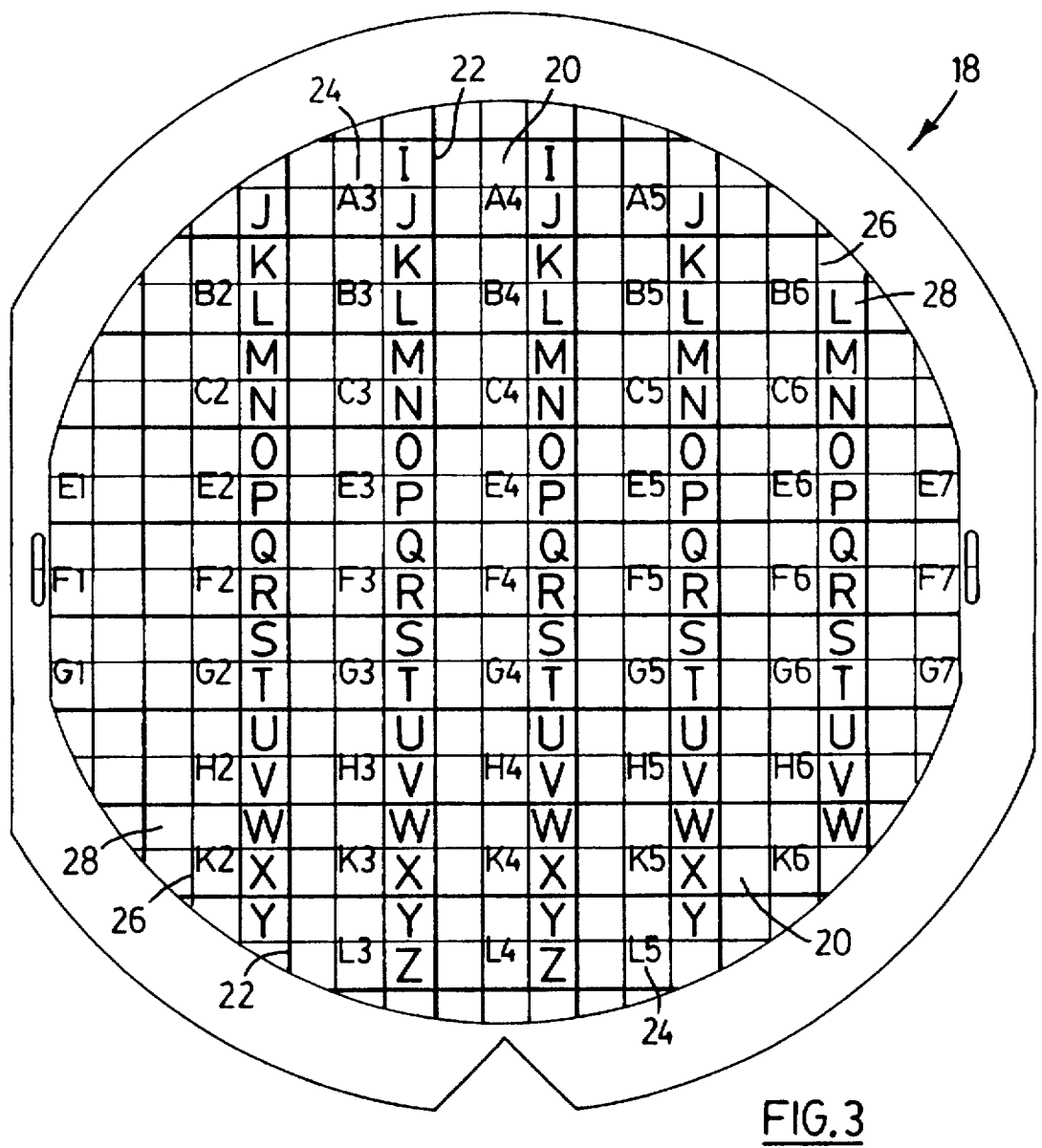
FIG. 3 is an enlarged top view of a grid used in the process of the present invention.

Referring to FIG. 3, a round grid is shown generally at 18. This grid 18 is divided into a plurality of rectangles 20 by relatively heavy lines 22, with each rectangle 20 identified by an alphanumeric identifier 24 such as A3, A4, A5, B3, B4, etc. The alpha number system shown herein is such that the letter designates the position on the vertical axis and the number indicates the position on the horizontal axis. Each of the rectangles 20 is further divided by lines 26 providing six smaller squares 28 in each rectangle 20, with the lines 26 being fine compared to the relatively heavy lines 22. Smaller squares 28 have openings of approximately 100 μm×100 μm. It is important that there is good contact between grid 18 and cover glass 10. Spaces between grid 18 and cover glass 10 can result in a shadowing effect on the resultant imprinted cover glass which is clearly undesirable.

Cover glass 10 with the grids 18 placed thereon is placed either in a high-vacuum coating station capable of an atmosphere of $1\times10^{-3}$ to $10^{-4}$ Torr, or in a sputter coating station equipped with chemically pure and inert metal target (s).

Cover glass 10 is then coated with an inert nobel metal film which can adhere to glass. Noble metals such as gold, platinum, palladium or a combination thereof may be used. Note however, that the inventors have found that gold on its own does not adhere well to the glass and therefore gold on its own would not be used. However, gold in combination with platinum has been found to be effective. Note that, in some instances platinum does not work well on its own because of its high melting point, but this restriction is based on the equipment used to coat the cover glass. A gold/platinum mixture produces an ultra-thin transparent coating with defined viewing fields. The inventors have found that by twisting a gold wire and a platinum wire together, good results are achieved. The film coating is approximately 2.5 to 5.0 nm thick.

Cover glass 10 coated with a metal film is then removed from the coating station. Grids 18 are removed by tilting the cover glass 10 to a vertical position and tapping it lightly. FIG. 1 shows the cover glass 10 on which metal grid patterns 12 are imprinted.

Figure 4:
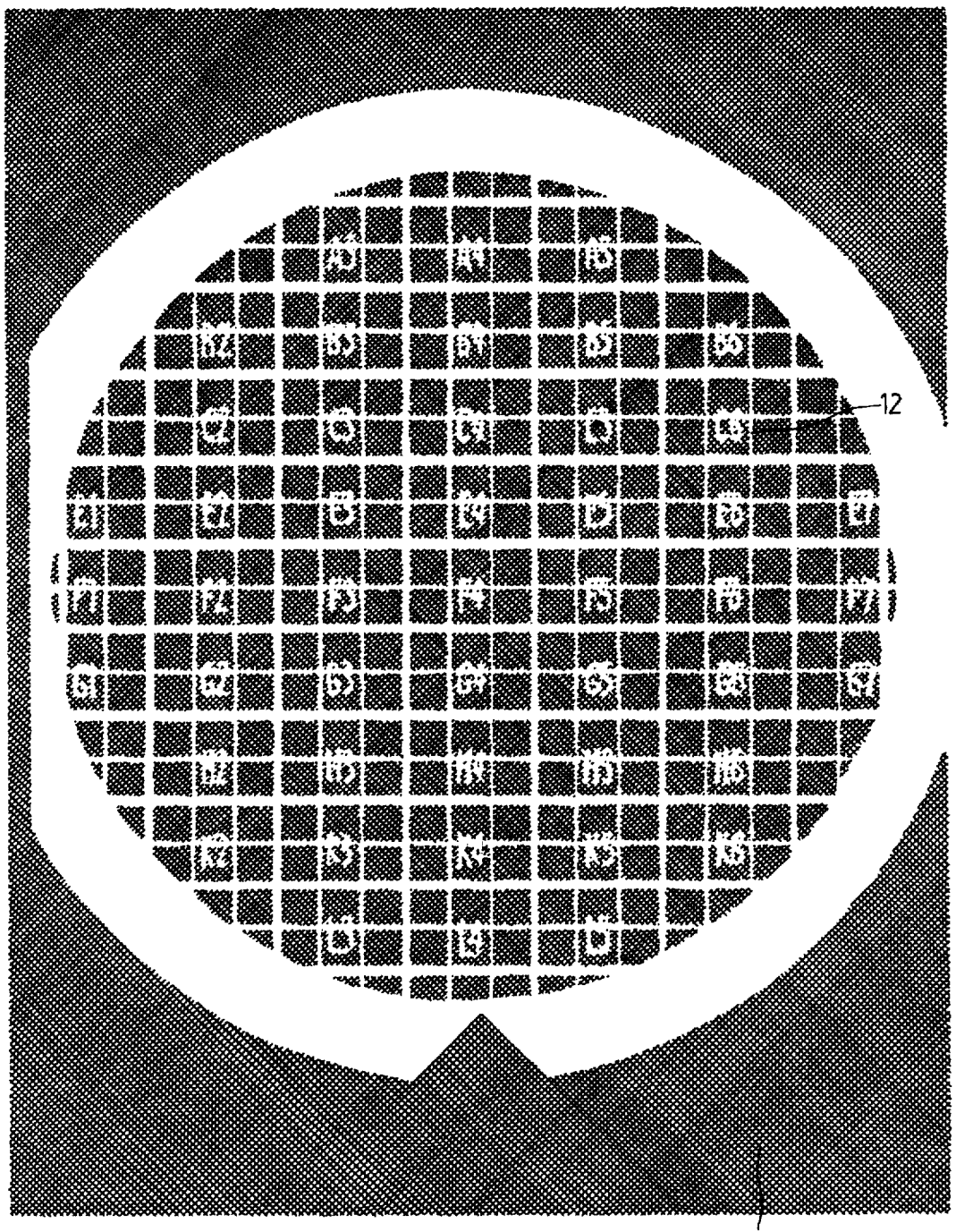
FIG. 4 is an enlarged top view of an imprint of a viewing field.

FIG. 4 shows an enlarged view of an imprint of a viewing field 12. The coating of the present invention is an ultra-thin transparent coating 29. The user can see through the cover glass 10 with the coating 29 thereon to count the relevant material.

Figure 6:
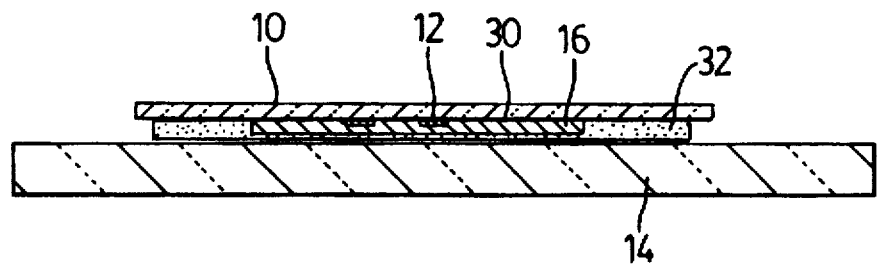
FIG. 6 is a cross sectional view of the microscope slide prepared according to the present invention and using a cover glass of the present invention.

Referring to FIGS. 2 and 6 a small wedge 16 (about ¼ to ⅕ mm thick) is cut from a 25 mm diameter mixed cellulose ester(MCE) filter on which asbestos fibres have been previously deposited. The microscope slide 14 is prepared such that filter wedge 16 with the fibre deposit side 30 facing upwardly and the imprinted side of the cover glass 10 having viewing fields 12 imprinted thereon is facing downwardly. Thus the fibres to be counted are adjacent to the imprinted viewing fields 12 and effectively the fibres and the viewing fields are in the same depth of focus the microscope. The cover glass 10 is prepared as discussed above. The filter wedge 16 is arranged so that it can cover viewing fields 12 which have been imprinted on the cover glass 10.

The slide is then prepared either with an acetone/triacetin clearing method or a dimethyl formamide (DMF)/Euparal clearing method, each of which is described below.

Acetone/Triacetin Clearing Method

A microscope slide 14 with filter wedge 16 is placed into the receiving slot at the base of a hot block acetone evaporator. About 250 μL of acetone is slowly injected into the inlet port of the vaporization chamber, previously heated to 70° C. Acetone vapour emerges in a stream to render the filter wedge 16 transparent and attached to the microscope slide 14.

Referring to FIG. 6, a fixative 32, in this case a drop of triacetin (3.5 to 5 μL) is placed on the cleared filter 16. The cover glass 10 prepared in accordance with the present invention is then lowered onto the fixative 32 on the cleared filter 16. Lacquer or nail polish is used around the edges of the cover glass in order to seal it to the glass slide. The filter preparation should be cleared and ready for examination in 2 to 5 minutes. If clearing is slow, the slide is warmed on a hot plate for 15 minutes at 50° C. to hasten clearing.

Dimethyl Formamide(DMF)/Euparal Clearing Method

A drop of dimethyl formamide clearing solution(20 μL) is added onto the filter wedge 16. The DMF solution contains 7 parts DMF, 3 parts acetic acid and 10 parts distilled water.

Figure 5:
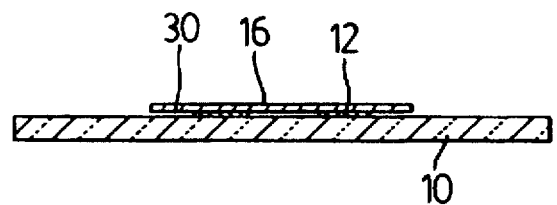
FIG. 5 is a cross sectional view of a cover glass with viewing field imprints thereon and with a cellulose acetate filter applied thereto.

The cover glass 10 with the filter wedge 16 as shown in FIG. 5 is placed on a hot plate at about 65° C. for 15 to 20 minutes until the wedge 16 becomes transparent and attached to the cover glass 10.

With reference to FIG. 6, a fixative 32, in this case a drop of Euparal resin (20 μL), is placed at the centre of a microscope slide 14. The cover glass 10 with the cleared filter 16 is lowered onto the Euparal resin 32 on a microscope slide 14. Then, slide 14 with filter wedge 16 and cover glass 10 thereon is placed in an oven preheated to 65° C. for 2 hours.

The acetone/triacetin clearing method is the preferred method since the user can use a generally accepted method of preparing a microscope slide and then use the cover glass of the present invention rather than a clear cover glass. Therefore the only difference between the existing method of preparing a microscope slide is the use of the cover glass of the present invention.

FIG. 2 shows the top view of a microscope slide 14 prepared in accordance with the present invention. The slide includes a label 34 in order to identify each slide when individual fibre counts are cross-checked by other analysts or laboratories.

An advantage of the present invention over prior art inventions is that the viewing fields 12, which are imprinted on a cover glass 10 by means of a thin metal film, are attached to the optical plane of the asbestos fibres and within the depth of focus of the microscope. Accordingly, fibre continuity can be observed unobstructedly beyond the boundaries of the viewing fields, thereby eliminating the counting errors incurred when using the slide in which a gold electron grid rests on the top of the filter previously cleared with dimethyl formamide and acetic acid solution. As well, prior art grid patterns which were imprinted on microscope slides or cover plates were considerably thicker and the material under observation could not be in the same depth of focus as the grid. Also, the microscope slides of this invention are suitable for shipping to other laboratories for inter-laboratory evaluations which is an improvement over slides prepared with gold electron grids included therein.

Throughout the description of this invention, the term "asbestos" means a product containing one or several types of asbestos fibres such as amosite, chrysotile, crocidolite, anthopylite, tremolite and acetilolite; and the term "synthetic mineral fibre" means a vitreous solid or glass-like fibre whose main element consists of silicon.

It will be appreciated that the above description related to embodiments by way of example only. Many variations on the invention will be obvious to those skilled in the art and such obvious variations are within the scope of the invention as described herein whether or not expressly described.

What is claimed as the invention is:

1. A process for Imprinting a viewing field on a cover glass which comprises the steps of:

annealing said cover glass;

placing a grid on the annealed cover glass, the grid having a plurality of spaced apart openings and a plurality of identifiers wherein each opening can be identified in relation to an identifier;

coating the annealed cover glass with the grid thereon with a film of a material chosen from the group consisting of an inert noble metal and alloys of inert noble metals which can adhere to the cover glass by a method chosen from the group consisting of a vacuum coating method and a sputtering method such that an imprint of the grid is formed in the film to produce a viewing field; and removing the grid from the coated cover glass.

2. A process for imprinting a viewing field on a cover glass as claimed in claim 1 wherein the thickness of the film is in the range of approximately 2.5 to 5.0 nm.

3. A process for imprinting a viewing field on a cover glass as claimed in claim 1 wherein the alloy is gold and platinum.

4. A process for imprinting a viewing field on a cover glass as claimed in claim 1 wherein the inert noble metal is palladium.

5. A process for imprinting a viewing field on a cover glass as claimed in claim 1 wherein the inert noble metal is platinum.

6. A process for imprinting a viewing field on a cover glass as claimed in claim 1 wherein the alloy is platinum and palladium.

7. A process for imprinting a viewing field on a cover glass as claimed in claim 1 wherein said annealing is conducted at approximately 250° C.

8. A process for imprinting a viewing field on a cover glass as claimed in claim 1 wherein the grid is a gold electron microscope grid.

9. A process for imprinting a viewing field on a cover glass as claimed in claim 1 wherein the grid Is a copper electron microscope grid.

10. A process for imprinting a viewing field on a cover glass as claimed in claim 1 wherein each opening in the grid is generally square.

11. A process for imprinting a viewing field on a cover glass as claimed in claim 10 wherein a plurality of adjacent square openings form a rectangle, the grid including a plurality of rectangles which are spaced at a first distance relative to one another and the first distance between rectangles being greater than a second distance between adjacent square openings forming the plurality of rectangles, and the grid defining first lines between adjacent rectangles and second lines between adjacent square openings wherein the first lines are thicker than the second lines.

12. A process for imprinting a viewing field on a cover glass as claimed in claim 11 wherein each rectangle has an identifier therein.

13. A process for imprinting a viewing field on a cover glass as claimed in claim 12 wherein the identifier includes two alphanumeric characters one alphanumeric character to identify a horizontal axis and the other alphanumeric character to identify a vertical axis.

14. A process for imprinting a viewing field on a cover glass as claimed in claim 1 including placing a plurality of grids in special relationship to one another on the annealed cover glass.

* * * * *